(12) United States Patent
Rogalla et al.

(10) Patent No.: US 7,946,172 B2
(45) Date of Patent: May 24, 2011

(54) DEVICE FOR MOUNTING ROTORS, IN PARTICULAR ARTICULATED SHAFTS, IN A BALANCING MACHINE

(75) Inventors: Martin Rogalla, Darmstadt (DE); Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 688 days.

(21) Appl. No.: 12/002,686

(22) Filed: Dec. 18, 2007

(65) Prior Publication Data

US 2008/0141773 A1  Jun. 19, 2008

(30) Foreign Application Priority Data

Dec. 18, 2006 (DE) .......................... 10 2006 060 200

(51) Int. Cl.
  *G01M 1/00* (2006.01)
(52) U.S. Cl. .............................. 73/475; 73/66
(58) Field of Classification Search .................. 73/461, 73/475, 66, 458, 460, 471, 473, 476
  See application file for complete search history.

(56) References Cited

U.S. PATENT DOCUMENTS

| | | | |
|---|---|---|---|
| 2,751,262 A | 6/1956 | Federn et al. | |
| 3,079,801 A | 3/1963 | Hack | |
| 3,584,512 A * | 6/1971 | Heiland et al. | ............... 73/475 |
| 3,724,238 A * | 4/1973 | Retali et al. | .................... 464/106 |
| 3,724,279 A | 4/1973 | Woolley | |
| 3,746,902 A * | 7/1973 | Hetzel | .......................... 310/67 R |
| 4,449,407 A | 5/1984 | Curchod | |
| 4,543,825 A * | 10/1985 | Schonfeld et al. | ............... 73/459 |
| 4,905,515 A * | 3/1990 | Himmler | .......................... 73/471 |
| 5,026,077 A * | 6/1991 | Warner | .......................... 277/398 |
| 5,600,062 A * | 2/1997 | Moench | .......................... 73/462 |
| 5,747,908 A * | 5/1998 | Saneshige et al. | ............... 310/91 |
| 6,354,536 B1 * | 3/2002 | Torok et al. | ...................... 244/39 |
| 6,694,812 B2 | 2/2004 | Loetzner et al. | |
| 7,571,886 B2 * | 8/2009 | Carter | .......................... 248/419 |
| 7,654,138 B2 * | 2/2010 | Thelen | .......................... 73/471 |
| 2002/0158533 A1 * | 10/2002 | Wright | ..................... 310/156.08 |

(Continued)

FOREIGN PATENT DOCUMENTS

DE  880 509  7/1949

(Continued)

OTHER PUBLICATIONS

European Search Report dated Nov. 30, 2009 (in German).

*Primary Examiner* — Hezron Williams
*Assistant Examiner* — Samir M Shah
(74) *Attorney, Agent, or Firm* — Collard & Roe, P.C.

(57) ABSTRACT

A device for mounting rotors, in particular articulated shafts, in a balancing machine has a bearing frame and a frame upper part, which is mounted on the bearing frame so as to be able to oscillate via spring bars and includes a spindle for rotatable mounting of a rotor. The frame upper part is mounted on the bearing frame via groups of spring bars, the groups being arranged at a distance from the axis of rotation of the spindle and at a distance from one another, and the longitudinal axes of the spring bars forming the spring bar groups being oriented parallel to the axis of rotation of the spindle. The spring bars forming the spring bar groups have an elongated, slender shape such that their rigidity in an axial direction is at least 100 times, in particular at least 300 times, greater than their radial flexural rigidity.

8 Claims, 2 Drawing Sheets

U.S. PATENT DOCUMENTS

| | | | |
|---|---|---|---|
| 2006/0058169 A1* | 3/2006 | Matusima | 494/84 |
| 2007/0108169 A1* | 5/2007 | Shimada et al. | 219/121.85 |

FOREIGN PATENT DOCUMENTS

| | | |
|---|---|---|
| DE | 26 08 891 | 9/1977 |
| DE | 37 16 210 | 12/1988 |
| DE | 43 42 667 | 6/1995 |
| DE | 10 2005 023 086 | 11/2006 |
| EP | 0 410 331 | 1/1991 |
| GB | 1 276 341 | 6/1972 |
| GB | 1 535 108 | 12/1978 |
| GB | 2 126 739 | 3/1984 |

* cited by examiner

DEVICE FOR MOUNTING ROTORS, IN PARTICULAR ARTICULATED SHAFTS, IN A BALANCING MACHINE

FIELD OF THE INVENTION

The invention relates to a mounting device for mounting rotors, in particular articulated shafts, in a balancing machine which has a bearing frame and frame upper part, which is mounted on the bearing frame so as to be able to oscillate via spring bars and which includes a spindle for rotatable mounting of a rotor.

BACKGROUND OF THE INVENTION

In a device of the type mentioned at the outset disclosed in DE 37 16 210 A1 the spring bars are arranged in planes perpendicular to the axis of rotation. In this case, the rotor can oscillate in a plane perpendicular to the spring bars and thus also effect pitch oscillations.

For balancing, articulated shafts are conventionally fixed horizontally at their ends to two rotatable spindles. Imbalance is measured at comparatively high rotational speeds, conventionally up to operating speed. The rotational speed measurements are predetermined and are adapted to the subsequent fitting conditions as the state of imbalance of articulated shafts can change depending on the rotational speed. This can be caused by play and friction in the joints and possibly on a sliding part and by curving of the articulated shaft housing.

In order to balance articulated shafts as close to operational conditions as possible, automatic articulated shaft balancing machines are required, in which the resonant masses and the rigidity of the mounting spindle support constitute conditions similar to operational conditions. A particularly simple embodiment of the resonant mass is deliberately avoided. In order to balance the articulated shaft as close to operational conditions as possible, the dynamic properties of the motor unit and differential gear, to which the articulated shaft is to be coupled, are reproduced in a configuration of the frame upper part, which configuration is of the aforementioned type and is substantially stringently conditional on isotropy and mass. The spring support of the oscillating frame upper part is thus also designed in such a way that, to measure the imbalance, the rotational speed lies above the resonant frequency of the bearing frame and the machine can therefore be operated in the "supercritical" region.

In a known articulated shaft balancing machine, the spring system supporting the bearing frame part, which is able to oscillate, is made of leaf springs. However, these springs may twist or bulge under load. As a result, the bearing frame has higher resonant frequencies which lie above the rotational speed measurements. The first resonant mode of said higher resonant frequencies is characterised by pitch of the frame upper part and the corresponding resonant frequency is referred to as relaxation resonance. If the balancing rotational speed approaches said relaxation resonance, the imbalance can no longer be recorded precisely. Furthermore, high tension levels are produced due to the excessive increase in resonance in the structure of the machine. This can lead to components failing and could put both the machine and people at risk. The possible rotational speed for measuring imbalance is hence capped by the relaxation resonance. Due to the mass of the tension absorbed by the articulated shaft at the upper part of the bearing frame as well as the mass of the articulated shaft, said relaxation resonance can fall to such an extent that the balancing machine can no longer be operated with the required rotational speed measurement.

SUMMARY OF THE INVENTION

Therefore, the object of the invention is to provide a mounting device of the type mentioned at the outset for mounting rotors so as to be able to oscillate, which device has a large resonance-free rotational speed measurement range. The device should have the smallest possible resonance frequencies for the first resonance modes in order to be able to perform supercritical measurements of imbalance and should comprise the greatest resonance frequencies possible for the higher resonance modes. Furthermore, the object of the invention is to configure the resilient support of the frame upper part in such a way that it is virtually as rigid in both a horizontal and vertical direction.

This object is achieved according to the invention by a mounting device for mounting rotors, in particular articulated shafts, in a balancing machine comprising a bearing frame and a frame upper part, which is mounted on the bearing frame so as to be able to oscillate via spring bars and includes a rotor mount for rotatable mounting of the rotor, wherein the frame upper part is supported on the bearing frame via at least three spring bars, the spring bars being arranged at a distance from the axis of rotation of the rotor mount and at a distance from one another and the longitudinal axes of the spring bars being aligned parallel to the axis of rotation of the rotor mount and the spring bars having an elongated, slender shape such that their rigidity in the axial direction is at least 100 times greater than their radial flexural rigidity. Advantageous embodiments of the invention are disclosed below.

According to the invention, the frame upper part is supported on the bearing frame via at least three spring bars, the spring bars being arranged at a distance from the axis of rotation of the rotor mount and at a distance from one another and the longitudinal axes of the spring bars being aligned parallel to the axis of rotation of the rotor mount and the spring bars having an elongated, slender shape so their rigidity in the axial direction is at least 100 times, in particular at least 300 times, greater than their radial flexural rigidity. It is particularly advantageous if the rigidity of the spring bars in the axial direction is at least 500 times greater than their radial flexural rigidity.

In a configuration according to the invention the spring bars are subject to a bending stress when the frame upper part moves in a direction radial to the axis of rotation of the rotor mount, the rigidity of the spring bars being configured in such a way that the lower resonance frequency of the frame upper part lies below the desired rotational speed measurement and thus imbalance in the supercritical region can be measured. During a tilting motion of the frame upper part, however, the spring bars are tensioned or under pressure, the rigidity thereof being at least 100 times greater due to their elongated, slender shape. This results in the relaxation resonance of the frame upper part increasing by 2.5 to 3 times that of the lower resonance frequency in such a way that a large, resonance-free frequency range is formed which can be used for measuring imbalance. The configuration according to the invention has the further advantage that the resilient support is isotropic to a large extent and is equally rigid in all radial directions with regard to the axis of rotation of the rotor mount. The invention further enables the device to be configured in a simple, cost-effective manner.

According to a further a further embodiment of the invention, in two parallel planes, which are at identical distances from the axis of rotation of the rotor mount, at least two respective spring bars can be arranged parallel to the axis of rotation, the spring bars of one plane being arranged so as to be symmetrical to those of the other plane. According to a further proposal of the invention, two mutually-spaced respective groups of spring bars consisting of a plurality of spring bars parallel to the axis of rotation can be provided in the two planes parallel to the axis of rotation of the rotor mount in order to increase the load-bearing capacity of the spring support whilst maintaining the differences in rigidity. The individual groups of spring bars can, in this case, be part of a one-piece metal sheet, the individual spring bars being formed by parallel slots penetrating the metal sheet and connected to one another at their ends via unslotted portions of the metal sheet. This configuration allows the groups of spring bars to be produced in a cost-effective manner and to be assembled in a simple manner.

The arrangement of the spring bars according to the invention is also relatively resilient to torque about the axis of rotation of the rotor mount. This resilience has proved to be troublesome in such a way that, according to a further proposal of the invention, a torque support can be provided which connects the frame upper part to the bearing frame and which has low rigidity in all radial directions with respect to the axis of rotation, but high rigidity when loaded as a result of twisting of the frame upper part. Said torque support preferably comprises two parallel first spring bars which are fixed to the frame upper part at one end and to a flexurally rigid center part at the other end, as well as two parallel second spring bars which extend transversely to the longitudinal direction of the first spring bars and are fixed to the connecting part at one end and to the bearing frame at the other end. The first and second spring bars and the connecting part can advantageously be cut in one piece from a metal sheet.

According to the invention it can furthermore be provided for the frame upper part to have a rotatably mounted spindle with a chuck to secure an end of a rotor, and a motor to rotatably drive the bearing spindle. This configuration confers a larger mass on the frame upper part which is able to oscillate, said mass simulating the dynamic properties of the fitting conditions and for which mass the articulated shafts to be balanced are intended. Hence, when measuring imbalance the operating conditions of the articulated shafts are resembled more closely.

BRIEF DESCRIPTION OF THE DRAWINGS

The invention will be described in more detail hereinafter with reference to embodiments illustrated the drawings, in which.

DETAILED DESCRIPTION OF THE PREFERRED EMBODIMENTS

Figure 1:
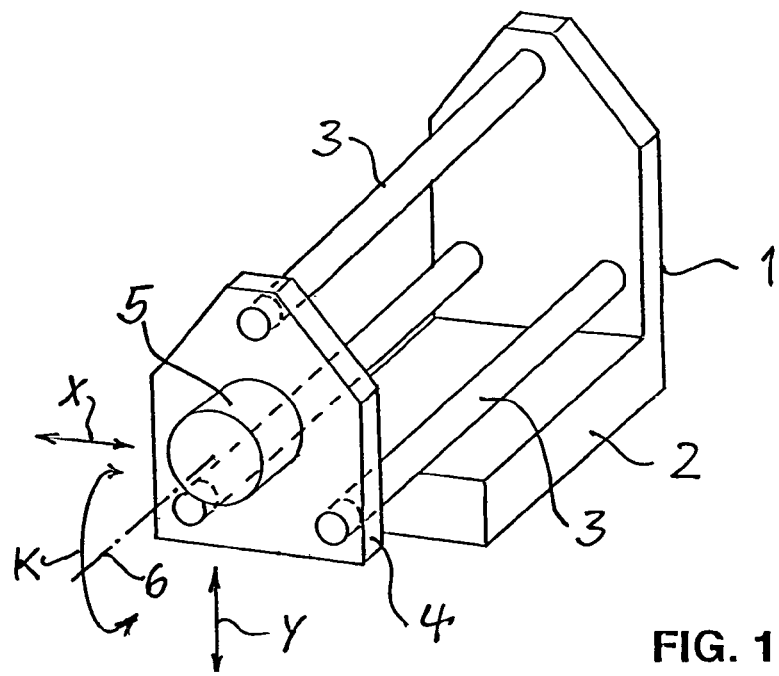
FIG. 1 is a schematic view of a device according to the invention.

The device shown in FIG. 1 for illustrating the invention comprises a bearing frame 1 which can be fixed in a stable manner to a base 2, for example on a foundation plate. Three parallel spring bars 3 are fixed at a distance from one another on the bearing frame 1, which spring bars extend parallel to the contact plane of the base 2 and thus horizontally. With regard to a vertical center plane of the bearing frame 1, the spring bars 3 are arranged symmetrically. The spring bars 3 are of equal length. To their free ends there is fixed a frame upper part 4 which comprises a rotor mount 5 at its center for rotatably mounting a rotor. The axis of rotation 6 of the rotor mount 5 runs parallel to the spring bars 3 in the center plane of the bearing frame 1.

In the device shown in FIG. 1, a load generated in direction X and direction Y, for example by the imbalance of a rotating rotor mounted in the rotor mount 5, leads to the spring bars 3 being subject to a bending stress. As the flexural section modulus of the spring bars 3 is relatively small due to their slender and elongated shape, the rigidity of the support is also relatively low; the support is flexible and results in a small resonance frequency of the frame upper part 4 for the first resonance modes.

During pitch or relaxation oscillations, denoted by the arrow K, the spring bars 3 are tensioned and under pressure. During this load, the rigidity of the spring bars 3 is many times higher and leads to a comparatively strong support of the frame upper part 4. The rigidity of this support is, in this case, not determined solely by the tensile strength and torsional rigidity of the spring bars 3 but also additionally by their spacing, as the forces at the spring bars 3 resulting from the pitching moment induced by oscillation reduce as the spacing increases. The invention is therefore based on the knowledge that, above all by means of a particularly slender shape of the spring bars and an adequately large distance between the spring bars, the rigidity of the support of the frame upper part 4 during load via pitching moments can be increased, in comparison to rigidity of the support in a radial direction, to such a degree that the resonance frequency of the frame upper part 4 for the higher resonance modes is 3 to 4 times that of the resonance frequency for the first resonance modes in such a way that a wider, resonance-free rotational speed range is produced between the lower resonance frequencies of the first resonance mode and the next highest relaxation resonance, which range can be used for supercritical measurements of imbalance.

Figure 2:
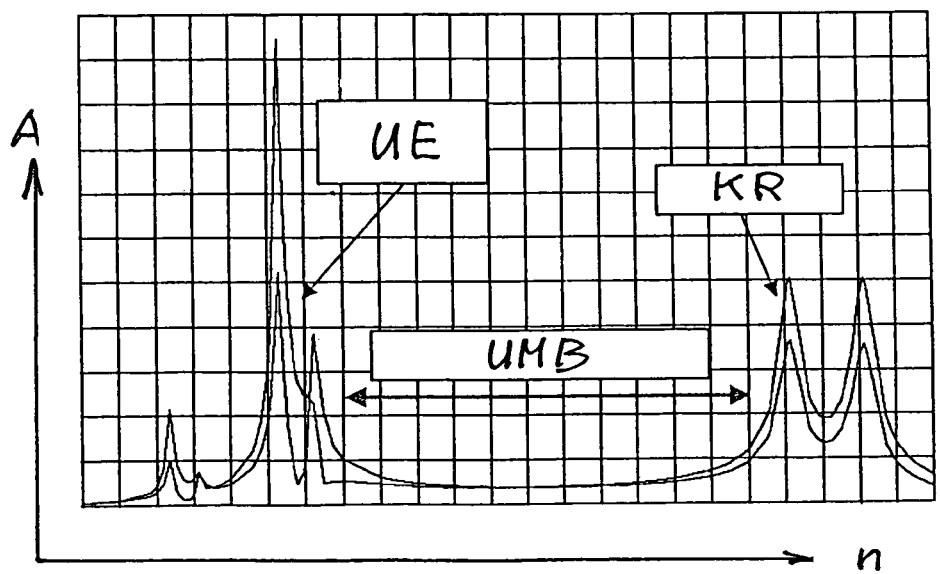
FIG. 2 is a graph of the amplitude course of the oscillation path over the rotational speed of a frame upper part according to the invention.

This is illustrated in the graph shown in FIG. 2. Here, the amplitude course A of the oscillation of a frame upper part of a device according to the invention is plotted against the rotational speed n. The amplitude deflection UE denotes the lower resonance frequency which develops during a proportionately low rotational speed. Subsequently, with increasing rotational speed, a wider resonance-free rotational speed range UMB emerges, in which imbalance can be measured. This range is capped by the relaxation resonance KR which results from the resonance frequency of the frame upper part for the higher resonance modes.

Figure 3:
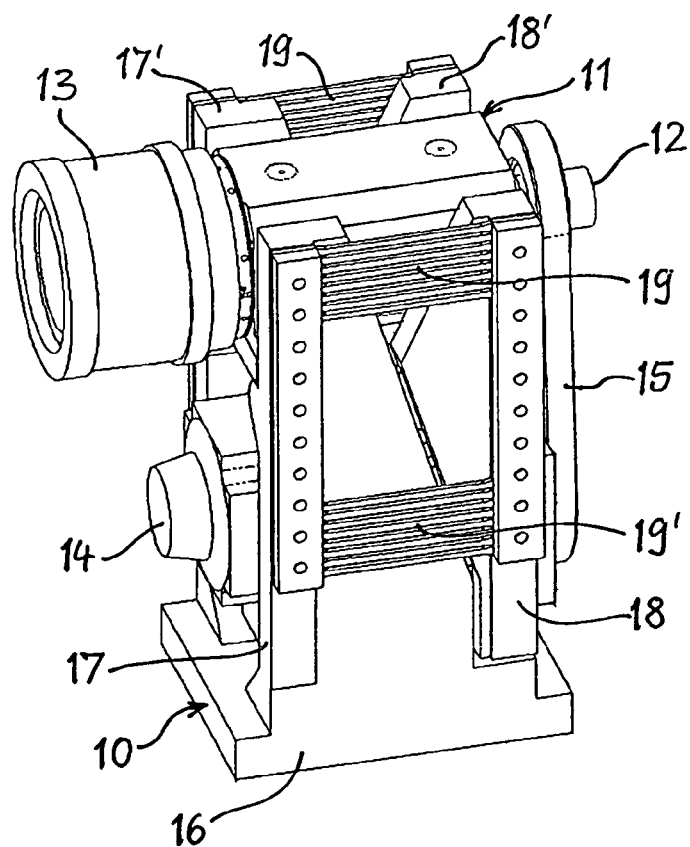
FIG. 3 is a view of a frame support for an articulated shaft balancing machine with a frame upper part supported on four groups of spring bars.

FIG. 3 shows a bearing frame 10 which is part of a balancing machine with two opposing spindles for mounting articulated shafts. The bearing frame 10 has a frame upper part 11 which is able to oscillate, in which there is arranged a spindle 12 with a chuck 13 for securing the end of an articulated shaft. An electric motor 14 is further fixed to the frame upper part 11. The motor 14 is arranged beneath the spindle 12 and is coupled to the spindle 12 by a belt drive 15.

The bearing frame 10 has a plate-shaped base 16 from which two parallel frame arms 17, 17' project upwardly. The housing of the spindle 12 and the motor 14 extend into the space between the arms 17, 17'. The arms 17, 17' are adjacent to two arms 18, 18' which are formed on the upper frame part 11 and extend from the housing of the spindle 12 as far as the vicinity of the base 16.

In order to resiliently, flexibly connect the frame upper part 11 to the bearing frame 10, four groups of spring bars are provided, each consisting of a plurality of parallel spring bars. The spring bar groups 19, 19' which are identical in construction, one below the other, are arranged in two vertical planes parallel to the axis of the spindle and are fixed to the outer surfaces of the neighbouring arms 17, 18 or 17', 18' which lie in said planes in such a way that the spring bars extend in a horizontal direction parallel to the axis of the spindle 12. Two spring bar groups 19 connect the upper end of the arms 17, 17' to the arms 18, 18'. The two other spring bar groups 19' connect the lower ends of the arms 18, 18' to the arms 17, 17'.

The spring bar groups 19, 19' preferably consist of a rectangular sheet made of spring steel which is divided into individual spring bars by a plurality of parallel longitudinal slots, which spring bars are connected together at the ends of the sheet by edge portions. The individual spring bars of the spring bar groups 19, 19' have an elongated, slender shape with a ratio of diameter d to length l of approximately 1:15. Herefrom, a ratio of radial flexural rigidity $C_r$ of the spring bars to axial rigidity $C_a$ under tension and pressure is calculated at 1:300. The rigidity ratio $C_r/C_a$ is determined solely by the shape of the individual spring bars and is independent of the number of spring bars. By choosing the number of spring bars in the spring bar groups 19, 19', the support of the frame upper part 11 can thus be adjusted to the loads to be absorbed without changing the rigidity ratio $C_r/C_a$ determined by the shape of the spring bar.

The frame upper part 11 is extremely rigidly supported against pitch and relaxation oscillations whilst at the same time being very resilient in a vertical and horizontal direction by means of the rigidity of the spring bar groups 19, 19', which is 300 times greater in an axial direction in the disclosed embodiment, and by means of the distance between the spring bar groups 19, 19' in a horizontal and vertical direction. This allows the frame upper part to have a low base resonance frequency and a large frequency distance to the relaxation resonance and the upper resonance frequencies.

The rigidity of the spring bar groups 19, 19' is relatively small even with load caused by torque about the axis of the spindle 12. If desired, twisting of the frame upper part can be largely prevented with a torque support. An embodiment of such a torque support is shown in FIG. 4.

Figure 4:
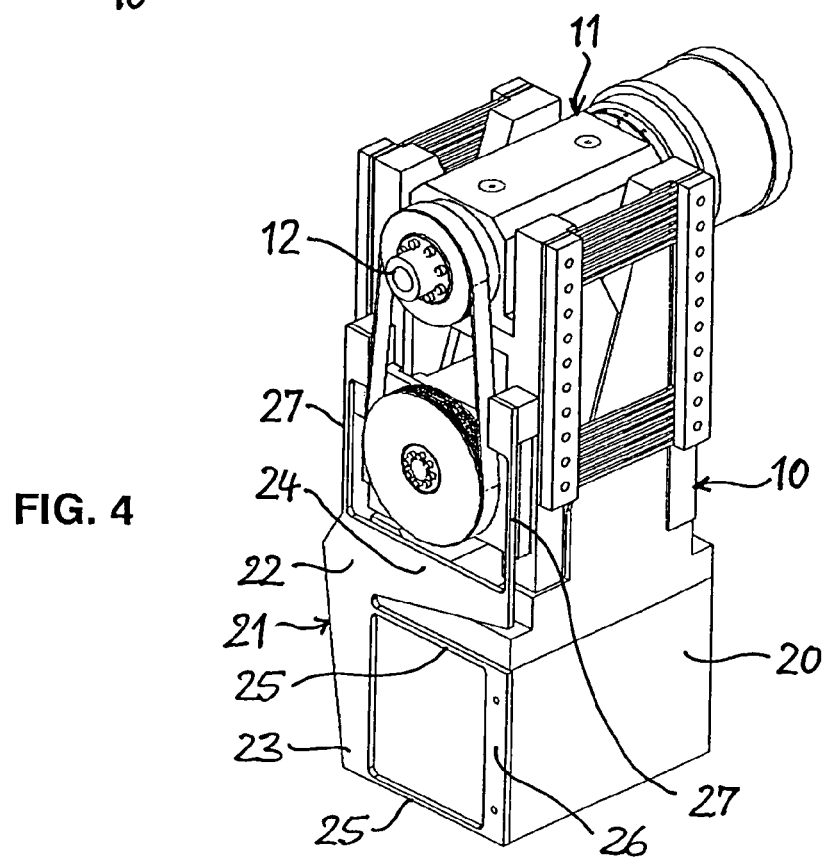
FIG. 4 is a bearing frame of an articulated shaft balancing machine with additional torque support.

In FIG. 4 the device shown in FIG. 3 is fixed to a square-shaped plinth 20 by its bearing frame 10. The plinth 20 is also connected to the frame upper part 11 by a torque support 21. The torque support 21 consists of a flexurally rigid central portion 22 which has two arms 23, 24 arranged at right angles to one another. From the one, vertically oriented arm 23 there extend two parallel spring bars 25 arranged at a distance from one another in a horizontal direction. The ends of the spring bars 25 are fixed to the plinth 20 with the aid of a frame 26 connecting said ends. Thus, the central portion 22 is held in the plinth 20 so as to be rigid against torsion but movable in a vertical direction. The other horizontal arm 24 is connected to the arms 18 and 18' of the frame upper part 11 by two parallel spring bars 27 arranged at a distance from one another and vertically oriented. The spring bars 27 allow a horizontal relative movement between the frame upper part 11 and the central portion 22.

The resilient flexibility of the frame upper part in a horizontal and vertical direction can be achieved in an unrestricted manner by the aforementioned configuration of the torque support 21. The additional spring resistance of the spring bars 25 and 27 can be considered when designing the spring bar groups 19, 19'. On the frame upper part 11, however, effective torque leads to the spring bars 25, 27 being tensioned or under pressure. In the case of such a load, the spring bars 25, 27 are very rigid so the frame upper part 11 cannot achieve any substantial rotation about the axis of the spindle.

What is claimed is:

1. A mounting device for mounting articulated shafts to be balanced in a balancing machine comprising a bearing frame and a frame upper part, which is mounted on the bearing frame so as to be able to oscillate via spring bars and includes a rotor mount having a horizontally arranged axis of rotation and adapted for rotatable mounting of one end of a horizontally arranged articulated shaft to be balanced in said balancing machine, and a motor for rotatably driving the rotor mount, wherein the spring bars are aligned parallel to the axis of rotation of the rotor mount and equal numbers of the spring bars are arranged in each one of two parallel vertical planes which are arranged on opposite sides of and at identical distances from the axis of rotation of the rotor mount, wherein the spring bars of one plane are arranged so as to be symmetrical to those of the other plane and at least two groups of at least two spring bars, one at a distance from the other, are provided in each plane and each spring bar has an elongated, slender shape such that its rigidity in the axial direction is at least 100 times greater than its radial flexural rigidity.

2. The mounting device according to claim 1, wherein the rigidity of each spring bar in the axial direction is at least 300 times greater than its radial flexural rigidity.

3. The mounting device according to claim 1, wherein the frame upper part is supported on the bearing frame via mutually spaced groups of spring bars comprising a plurality of spring bars parallel to the axis of rotation.

4. The mounting device according to claim 1, wherein the individual groups of spring bars are part of a one-piece metal sheet, the individual spring bars being formed by parallel slots penetrating the metal sheet and connected to one another at their ends via unslotted portions of the metal sheet.

5. The mounting device according to claim 1, wherein a torque support is provided, which connects the frame upper part to the bearing frame and in that the torque support has low rigidity in a radial direction with respect to the axis of rotation, but high rigidity when loaded as a result of twisting of the frame upper part.

6. The mounting device according to claim 5, wherein the torque support includes two parallel first spring bars, which are attached to the frame upper part at one end and to a flexurally rigid center part at the other end, as well as two parallel second spring bars, which extend transversely to the longitudinal direction of the first spring bars and are attached to the center part at one end and to the bearing frame at the other end.

7. The mounting device according to claim 6, wherein the first and second spring bars and the center part are cut in one piece from a metal sheet.

8. The mounting device according to claim 1, wherein the frame upper part has a rotatably mounted spindle with a chuck to secure an end of a rotor, and a motor to rotatably drive the bearing spindle.

* * * * *